Patented Nov. 15, 1938

2,136,378

UNITED STATES PATENT OFFICE 2,136,378

VINYL RESIN COMPOSITION

Arthur K. Doolittle, South Charleston, W. Va., assignor, by mesne assignments, to Union Carbide and Carbon Corporation, a corporation of New York No Drawing. Application July 9, 1936, Serial No. 89,774

11 Claims. (Cl. 134—26)

The invention relates to vinyl resin compositions of the type suitable for use in the preparation of lacquers, varnishes, dopes and other coating and finishing materials. It is particularly concerned with novel and improved solvents for use in such vinyl resin compositions.

Vinyl resins of various kinds have been suggested for use in surface coatings of all types, and many improvements and modifications of the first simple lacquer-like solutions of these materials have been proposed in the art. However, physical and chemical characteristics inherent in the different classes of vinyl resins have largely precluded the widespread adoption of them as ingredients of surface coating compositions. Among the difficulties encountered in formulating satisfactory lacquers and the like of a vinyl resin base is the problem of obtaining suitable solvents for these resins. Many compounds having solvent action on other kinds of lacquer gums and resins will not dissolve the vinyl resins, and those known solvents which do exhibit solvent power for the latter resins are often deficient in other characteristics. The value of a solvent in a lacquer formula is dependent on numerous other factors in addition to actual solvent ability, and properties such as evaporation rate, compatibility with resins, gums and diluents, ability to resist blush or other faults in the finished lacquer film, and color and odor, are all of importance and must be considered in compounding satisfactory lacquer compositions.

It is an object of this invention to provide vinyl resin compositions excellently adapted to the production of surface coatings and finishes. Another object is to provide solvent compounds which incorporated in a thinner formula are adapted to produce improved vinyl resin lacquers, varnishes and the like.

I have found that certain ketones, in particular dipropyl ketone and methylisobutyl ketone, have a marked solvent power for vinyl resins, and will in addition impart to lacquers compounded from thinner formulas employing these solvents the requisite and above-mentioned desirable properties. These two ketones are substantially water-white liquids which have relatively high boiling points. Dipropyl ketone has an evaporation rate somewhat lower than that of such well known lacquer solvents as amyl acetate, while methylisobutyl ketone has an evaporation rate slightly greater than that of normal butyl acetate. Both of these ketones are therefore very effective in improving the flowing and leveling properties of a vinyl resin lacquer, since they enable an applied surface film thereof to maintain maximum fluidity as the solvents evaporate during drying of the lacquer. Having a very slight solubility for water, dipropyl ketone and methylisobutyl ketone effectively resist the formation of moisture blush in a drying film, and they are both compatible with substantially all of the gums and resins commonly employed in lacquer compounding.

In the thinner or vehicle portion of any resin base lacquer there is usually included, in addition to the actual resin solvent, other volatile diluents of non-solvent character. Toluene, xylene, benzene or other relatively inexpensive hydrocarbon derivatives are commonly used in this capacity, and the solvents of this invention are not only compatible with such diluents, but show an exceptionally high dilution ratio for such compounds. In formulating suitable thinner compositions both the dipropyl and methylisobutyl ketone may be used, in conjunction with other solvents if desired, and with the usual non-solvent diluents, or either ketone may serve as the sole solvent ingredient of the vehicle. The most desirable proportions of either or both compounds may be varied, and will depend to a certain extent on the vinyl resin proportions and the nature of the other ingredients in the solid portion of the lacquer.

The vinyl resins with which the invention is directly concerned are those which may be prepared by the conjoint polymerization of vinyl halides, such as vinyl chloride, with vinyl esters of the lower aliphatic acids, such as vinyl acetate, propionate, butyrate, and formate. Preferred resins of this type may be prepared from vinyl chloride and vinyl acetate, in the proportions of about 60 to 95 parts of vinyl chloride to from 40 to 5 parts of the acetate. Particularly desirable resins of this preferred group are those which contain from about 80 to 90 parts of the chloride. The vinyl resins and their production form no part of my invention. They may be made, for example, by the process described in E. W. Reid Patent No. 2,064,565, dated December 15, 1936. With these resins suitable stabilizing and other modifying agents, plasticizers, dyes, pigments and other ingredients may be used, and the solvents here disclosed are considered applicable with any lacquer composition employing the above vinyl resins as an essential constituent.

The following examples will serve to illustrate certain embodiments of the invention:

Example 1

A coating composition was made containing a vinyl resin resulting from the conjoint polymerization of vinyl chloride and vinyl acetate. The empirical composition of this resin was about 87 parts vinyl chloride and 13 parts vinyl acetate, and the resin was purified before use by extraction and partial precipitation from partial solvents to remove all unpolymerized material, catalytic residues, and more easily soluble polymeric fractions of lower average apparent molecular weight. The composition was as follows:

|  | Per cent (by weight) |
|---|---|
| Vinyl resin | 11.5 |
| "Sublimed blue lead" | 29.0 |
| Di (beta-butoxy ethyl) phthalate | 2.2 |
| Thinner | 57.3 |

The thinner, or solvent vehicle, was composed of the following solvents and non-solvents:

|  | Per cent (by volume) |
|---|---|
| Methylisobutyl ketone | 40 |
| Dipropyl ketone | 10 |
| Toluene | 40 |
| Xylene | 10 |

This produced a coating of spraying viscosity in which the stabilizer, blue lead, served also as a pigment. The coating is one especially adapted for finishing metal surfaces, and can be subjected to high baking temperatures without decomposition of the vinyl resin.

Example 2

The above thinner formula was also used in making porcelain-like finishes employing other pigments and stabilizers, and in the compounding of a clear lacquer coating, the latter of the following composition:

|  | Percent (by weight) |
|---|---|
| Vinyl resin | 15 |
| Lead Phenolate | 1.5 |
| Thinner (as in Example 1) | 83.5 |

Both of these coatings were of spraying viscosity, and exhibited excellent finish characteristics after baking on metal surfaces.

Example 3

The following thinner compositions employ the ketones separately as the essential solvent material:

|  | Formula I (percent by volume) | Formula II (percent by volume) |
|---|---|---|
| Dipropyl ketone | 25 |  |
| Methylisobutyl ketone |  | 50 |
| Toluene | 75 | 50 |

Various lacquers compounded from the above formulae with a base of conjointly polymerized vinyl resin have produced coatings of excellent characteristics both from the point of improved flow during application, as well as in the properties of the dried finished film.

It will be understood that the above examples are merely illustrative, and that considerable variation in proportions of the novel solvent material, as well as in the nature of the other thinner components, is possible within the intent of the invention, and except for the use of a vinyl resin base, the constituents of the solid portion of the lacquer are of no particular significance to the novelty here involved.

This application contains subject matter in common with my copending application Serial No. 715,662, filed March 15, 1934. The invention should not be limited other than as defined in the appended claims.

I claim:

1. A vinyl resin composition essentially comprising a vinyl resin substantially identical with a resin resulting from the conjoint polymerization of a vinyl halide with a vinyl ester of an aliphatic acid, and a solvent comprising at least one member of the group consisting of dipropyl ketone and methylisobutyl ketone.

2. A vinyl resin composition essentially comprising a vinyl resin substantially identical with a resin resulting from the conjoint polymerization of a vinyl halide with a vinyl ester of an aliphatic acid, and a solvent comprising dipropyl ketone.

3. A vinyl resin composition essentially comprising a vinyl resin substantially identical with a resin resulting from the conjoint polymerization of a vinyl halide with a vinyl ester of an aliphatic acid, and a solvent comprising methylisobutyl ketone.

4. A vinyl resin composition essentially comprising a vinyl resin substantially identical with a resin resulting from the conjoint polymerization of a vinyl halide with a vinyl ester of an aliphatic acid, and a solvent containing a substantial quantity of at least one member of the group consisting of dipropyl ketone and methylisobutyl ketone as the essential solvent material.

5. A vinyl resin composition essentially comprising a vinyl resin substantially identical with a resin resulting from the conjoint polymerization of a vinyl halide with a vinyl ester of an aliphatic acid, and a solvent containing a substantial quantity of dipropyl ketone as the essential solvent material.

6. A vinyl resin composition essentially comprising a vinyl resin substantially identical with a resin resulting from the conjoint polymerization of a vinyl halide with a vinyl ester of an aliphatic acid, and a solvent containing a substantial quantity of methylisobutyl ketone as the essential solvent material.

7. A vinyl resin coating composition essentially comprising a vinyl resin substantially identical with a resin resulting from the conjoint polymerization of a vinyl halide with a vinyl ester of an aliphatic acid, dissolved in a thinner containing as the essential solvent material a mixture of dipropyl ketone and methylisobutyl ketone, and a volatile hydrocarbon diluent.

8. A vinyl resin coating composition essentially comprising a vinyl resin resulting from the conjoint polymerization of vinyl chloride with vinyl acetate and containing from 80% to 90% by weight of vinyl chloride, dissolved in a thinner containing as the essential solvent material a mixture of dipropyl ketone and methylisobutyl ketone, and a volatile hydrocarbon diluent.

9. A vinyl resin coating composition essentially comprising a vinyl resin resulting from the conjoint polymerization of vinyl chloride with vinyl acetate and containing from 80% to 90% by weight of vinyl chloride, dissolved in a thinner containing as the essential solvent material not more than about 10% by volume of dipropyl ketone, and a volatile non-solvent hydrocarbon diluent.

10. A vinyl resin coating composition essentially comprising a vinyl resin resulting from the conjoint polymerization of vinyl chloride with vinyl acetate and containing from 80% to 90% by weight of vinyl chloride, dissolved in a thinner composed of a mixture of dipropyl ketone and methylisobutyl ketone in an amount about 50% by volume of the total thinner with the balance a volatile non-solvent hydrocarbon diluent.

11. A vinyl resin coating composition essentially comprising a vinyl resin resulting from the conjoint polymerization of vinyl chloride with vinyl acetate and containing from 80% to 90% by weight of vinyl chloride, dissolved in a thinner composed of a mixture of about 10% by volume of dipropyl ketone and 40% by volume of methylisobutyl ketone, with a balance of a volatile non-solvent hydrocarbon diluent.

ARTHUR K. DOOLITTLE.